United States Patent [19]

Steidl et al.

[11] Patent Number: 5,035,230
[45] Date of Patent: Jul. 30, 1991

[54] DISPOSABLE FOOD HEATER

[76] Inventors: Gary V. Steidl, 304 Via De Caballo, Olivenhain, Calif. 92024; Cullen M. Sabin, 3346 Ullman St., San Diego, Calif. 92109; Dennis A. Thomas, 20032 Pacific Coast Hwy., Malibu, Calif. 90265

[21] Appl. No.: 484,227

[22] Filed: Feb. 23, 1990

[51] Int. Cl.⁵ ............................................. F24J 1/00
[52] U.S. Cl. ..................................... 126/263; 44/251; 426/113
[58] Field of Search ............... 126/263, 204, 400; 426/114, 113; 424/489, 19; 44/3.3

[56] References Cited

U.S. PATENT DOCUMENTS

| | | | |
|---|---|---|---|
| 2,541,345 | 2/1951 | deNavarre et al. | 126/263 |
| 2,573,791 | 11/1951 | Howells | 126/263 |
| 2,680,063 | 6/1954 | Shapiro | 126/263 |
| 3,175,558 | 3/1965 | Caillouette et al. | 126/263 |
| 3,301,250 | 1/1967 | Glasser | 126/263 |
| 3,585,982 | 6/1971 | Hollinshead | 126/263 |
| 3,871,357 | 3/1975 | Grosso et al. | 126/263 |
| 3,976,049 | 8/1976 | Yamashita et al. | 126/263 |
| 4,013,061 | 3/1977 | Trumble et al. | 126/263 |
| 4,033,323 | 7/1977 | Trumble et al. | 126/263 |
| 4,043,314 | 8/1977 | Trumble et al. | 126/263 |
| 4,338,098 | 7/1982 | Yamaji | 126/263 |
| 4,501,259 | 2/1985 | Apellaniz | 126/263 |
| 4,597,959 | 7/1986 | Barr | 424/496 |
| 4,741,324 | 5/1988 | Ina et al. | 126/263 |
| 4,748,035 | 5/1988 | Apellaniz | 126/263 |
| 4,753,085 | 6/1988 | Labrousse | 126/263 |
| 4,771,671 | 9/1988 | Doukhan et al. | 126/263 |
| 4,775,002 | 10/1988 | Iwamoto | 126/400 |
| 4,780,117 | 10/1988 | Lahey | 126/263 |
| 4,929,448 | 5/1990 | Ibsen | 424/489 |

Primary Examiner—James C. Yeung
Attorney, Agent, or Firm—Knobbe, Martens, Olson & Bear

[57] ABSTRACT

Control of the exothermic chemical reaction between an oxidizing agent and an associated fuel, particularly potassium permanganate and ethylene glycol, is produced by binding the oxidizing agent such that there is a controlled exposure of the oxidizing agent to the fuel, the controlled exposure of the oxidizing agent to the fuel corresponding to a predetermined rate of reaction.

27 Claims, 7 Drawing Sheets

DISPOSABLE FOOD HEATER

BACKGROUND OF THE INVENTION

The invention relates to apparatus and methods for providing controlled exothermic chemical reactions which produce a heat output of a predetermined, controlled duration and intensity. Particularly, the invention relates to apparatus which produce heat by use of controlled exothermic chemical reactions.

The oxidation of alcohols and the associated liberation of heat energy during the oxidation reaction is well documented. The number of oxidizing agents available to oxidize alcohols is quite extensive, yet the most common oxidizing agents are those comprising manganese and chromium. For instance, primary alcohols can be oxidized into carboxylic acids, usually by heating with aqueous potassium permanganate. Alternatively, potassium chromate may be used to oxidize primary alcohols into aldehydes, which are in turn readily oxidized to acid.

Additionally, secondary alcohols may be oxidized to ketones by a variety of agents; for instance, by chromic acid, aqueous potassium chromate ($K_2Cr_2O_7$), chromium sesquixoide in glacial acidic acid or chromium dioxide ($CrO_2$) in pyridine.

However, use of exothermic oxidation reactions to provide heat under controlled conditions is fraught with a number of inherent difficulties. For instance, common oxidizing agents are strong oxidizers and may produce a fire hazard if not properly contained in a controlled environment. Also, the reaction rate of oxidation reactions may be very rapid, thus producing an instantaneous and intense release of heat when the oxidizing agent and the fuel come in contact.

In light of these difficulties, it is important that precise control and containment of the intensity and duration of the reaction be obtainable and available. To provide such control, we have determined that the oxidizing agent and the fuel must be selectively exposed to each other in amounts which both produce a specific, calculated amount of heat evolution and also react in a sustained and controlled fashion without combustion or extreme fluctuations in heat evolution. Thus, by controlling the exposure of the reactants to each other the rate, intensity and duration of the chemical reaction may be controlled. Particularly, when the use of an exothermic chemical reaction is desirable for use in conjunction with a heating device, preferably a food heater, the control and containment of the chemical reaction achieves an even greater importance.

To provide optimal heating characteristics for a food heater, a chemical heater should have the following attributes: (1) the heater should have a high heat output per unit mass of reactants; (2) the reaction rate of the reactants should be easily controllable over a wide range of times and temperatures; and (3) the reactants should have as their major component a liquid such that heat transfer is optimized between the heat provided by the reaction and the material to be heated by conduction. These particular attributes are provided by a controlled exothermic chemical reaction.

Accordingly, it is one object of this invention to provide a novel method of providing a controlled exothermic chemical reaction and the use of such a method in conjunction with a heating apparatus. Another object of this invention is to provide a food heater which provides a controllable and accurate rate of heat input to the material to be heated.

SUMMARY OF THE INVENTION

An apparatus and method for heating is described herein. The apparatus includes a disposable container having a first zone and a second zone, with a substantially solid oxidizing agent sealed within the first zone and a substantially liquid fuel sealed within the second zone. The fuel is complimentary with the oxidizing agent, so that an exothermic chemical reaction is initiated when the oxidizing agent and the fuel contact each other. The apparatus also further comprises a separator located between the first zone of the container and the second zone of the container; the separator operates to provide a fluid communication between the two zones, thus initiating a controlled exothermic chemical reaction within the container.

In the apparatus of the invention, the solid oxidizing agent is preferably potassium permanganate, and most preferably includes a means for selectively exposing the oxidizing agent to the fuel, thus controlling the propagation of the exothermic reaction. The means for controlling propagation of the exothermic reaction preferably comprises a selectively dissolvable binding agent, most preferably sodium silicate, into which the oxidizing agent is bound.

The binding agent dissolves during the exothermic reaction to controllably expose the oxidizing agent to its complementary fuel at a predetermined rate, thus providing the controlled exothermic chemical reaction.

A method for heating food is also described, comprising the steps of: providing a heating apparatus which comprises a container having a first zone containing an oxidizing agent and a separate second zone containing a fuel, with a separator located between the first zone and the second zone; compromising the separator to permit contact between the oxidizing agent located in the first zone and the fuel located in the second zone to initiate an exothermic chemical reaction; providing a food portion in association with the container; and heating the food portion by the heat produced by the exothermic chemical reaction.

A method of providing a controlled exothermic chemical reaction is also described. The method comprises the steps of providing an oxidizing agent which is bound within a water-soluble inorganic binding agent; providing a fuel in an aqueous solution which is capable of reacting with the oxidizing agent; combining the oxidizing agent and the fuel to initiate an exothermic chemical reaction; and gradually dissolving the binding agent with the fuel solution to control the chemical reaction.

DETAILED DESCRIPTION OF THE PREFERRED EMBODIMENT

The rapid exothermic combustion reaction resulting from the oxidation of ethylene glycol ($C_2H_6O_2$) and other polyols by potassium permanganate ($KMnO_4$) is well documented. This particular exothermic chemical reaction proceeds without external ignition and provides a source of heat which can be initiated on demand.

Additionally, the ethylene glycol/potassium permanganate reaction has the ability to proceed within sealed containers without the need for venting the resultant combustion gasses. This particular reaction also has the ability to proceed in an aqueous environment. The ability of this reaction to proceed in an aqueous environment is an important aspect of the present invention in that surrounding aqueous materials can transfer reaction generated heat, thereby increasing the efficacy of this reaction for use in conjunction with the heating devices of the present invention, particularly conduction food heaters. However, those skilled in the art will appreciate that any of a wide variety of known oxidizing agents and appropriate fuels can be used in the present invention.

The oxidation reaction between an oxidizing agent and a fuel, particularly the reaction between potassium permanganate and a polyol such as ethylene glycol, is rate-limited by the contact and mixing of the reactants with each other. For instance, by diluting the ethylene glycol fuel component of the oxidation reaction with an appropriate solvent, i.e., water, the reaction rate between the ethylene glycol and the potassium permanganate can be rate-limited by the reduced rate of fuel contact with the oxidizing agent caused by the fuel dilution. As the amount of water increases relative to the amount of ethylene glycol, the overall reaction rate decreases, assuming that a constant amount of oxidizing agent is exposed to the fuel solution. Therefore, the maximum temperature and/or the length of time heat is produced may be controlled by appropriate adjustment of the water/ethylene glycol ratio for any effective amount of ethylene glycol.

Conversely, the reaction may also be rate-limited by reducing the amount of the potassium permanganate oxidizing agent relative to the fuel. However, potassium permanganate has limited solubility in inorganic solvents, particularly water. Therefore, when it is desirous to have this oxidation reaction proceed in an aqueous environment with a diluted potassium permanganate component, the potassium permanganate oxidizing agent remains substantially in crystalline form. These undiluted potassium permanganate crystals produce areas of localized combustion and/or localized boiling when they come in contact with the ethylene glycol fuel. Therefore, although dilution of the potassium permanganate theoretically reduces the reaction rate, these localized areas of combustion and/or boiling reduce control of the duration and intensity of heat output and increase the possibility of unwanted combustion.

We have discovered that in order to control the duration and intensity of exothermic oxidation reactions, particularly those using highly reactive oxidizing agents, oxidizing agents may be bound within a binding agent which selectively exposes the oxidizing agent to the fuel source. This is preferably accomplished by binding the oxidizing agent with a binding agent which is soluble in the reaction environment. By surrounding the oxidizing agent with a solubilizable binding agent, the rate of exposure of the oxidizing agent to the fuel may be controlled during the reaction as the binding agent solubilizes to expose the bound oxidizing agent, thus providing control over the duration and intensity of the evolved heat.

As mentioned above, the fuel used in the oxidation reaction may be diluted with an appropriate solvent to rate-limit the reaction. Thus, in one embodiment, the amount of water present in the ethylene glycol fuel solution may vary, depending upon the reaction temperature and duration of reaction desired, with the concentration of ethylene glycol in the solution satisfying the aforementioned criteria of extent and duration of reaction. However, the solvent used to dilute the fuel also has particular efficacy in the present invention as a means for solubilizing the binding agent used to bind the oxidizing agent, as well as acting as a heat transfer medium.

A variety of binding agents may be used in conjunction with the oxidizing agent of choice in the present invention. These binding agents may be selected from those commonly known in the art. Preferably, the binding agent for use in the present invention is a binding agent soluble in the fuel composition and/or reaction zone of the reaction. For instance, an organic-based binding agent is preferably used when the fuel is diluted in an organic solvent, whereas an inorganic-based binding agent is preferably used when the fuel is diluted in an inorganic solvent.

In a preferred embodiment, an excess of fuel will be present in the reaction milieu to assure continuous exposure of fuel to the oxidizing agent, with the appropriate fuel solvent used exclusively to provide the desired rate of solubilization of the binding agent. However, any appropriate mixture of fuel and diluent may be used in the present invention to provide control of heat output and solubility of the binding agent.

In a preferred embodiment, the oxidizing agent comprises potassium permanganate crystals which are bound within a binding agent comprising sodium silicate solution ($Na_2SiO_3$), such as that commercially available from J. T. Baker (Stock No. 3877-01). Commercially available sodium silicate contains an excess of silica in colloidal suspension in the sodium silicate solution, and is available as a heavy, clear solution with a specific gravity of about approximately 1.38. The sodium silicate may be diluted with a suitable solvent, preferably a polar inorganic solvent, and most preferably water. The oxidizing agent is thoroughly and consistently mixed throughout the binding agent, preferably uniformly distributed throughout. Uniform distribution of the oxidizing agent throughout the binding agent is preferable in that it provides a consistant, uniform presentation of the oxidizing agent to the fuel throughout the solubilization of the binding agent.

The geometry and configuration of the bound oxidizing agent assists in providing control over the chemical reaction. For instance, a bound oxidizing agent in the form of uniform, solid pellets have a tendency to settle, aggregate and fuse to each other when placed in the aqueous reaction milieu. Settling and aggregation of the bound form of the oxidizing agent decreases the surface area of the pellet accessible to the fuel solution and produces a resultant decrease in the reaction rate which in turn results in reduction of control over the reaction.

Therefore, the configuration and geometry of the bound oxidizing agent of the present invention is an important factor in providing control over the rate and duration of the reaction. In one preferred configuration, the bound oxidizing agent is in a solid form having a geometry which presents a relatively constant active surface of oxidizing agent to the fuel throughout the desired duration of the reaction and throughout the solubilization of the binding agent, even near oxidizing agent exhaustion. A preferred geometry will also provide necessary fuel around the exposed oxidizing agent at all times during the reaction. Preferably, large fuel migration paths to the oxidizing agent are not required.

Figure 1:
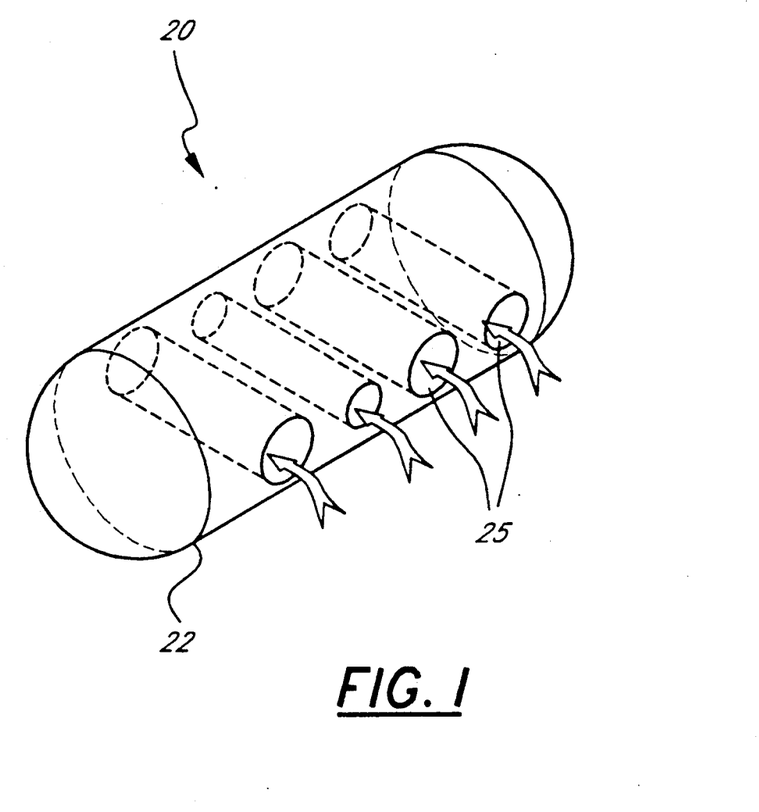
FIG. 1 is a perspective view of the bound oxidizing agent of the present invention.

Referring to FIG. 1, at least one suitable geometry for the bound oxidizing agent 20 of the present invention comprises bound oxidizing agent formed into short cylinders 22, the cylinders 22 comprising one or more centerline holes 25 extending throughout the cylinder. The wall thickness of the cylinder 22 between the interior of the hole and the periphery of the cylinder 22, in conjunction with the solubility of the binding agent assists in determining the duration of the reaction. The centerline holes 25 preferably provide a consistent distribution of fuel along the entire surface area of the cylinder 22 and further provide fuel flow (as indicated by arrows) to the entire surface area of the cylinder, even if aggregation or fusion of the cylinders occur.

Preferably, the interior surface areas of the centerline holes 25 through the cylinder 22 increase at roughly the same rate the exterior diameter of the cylinder 22 decreases so that the nominal surface area of the cylinder remains relatively constant. Also, if the cylinder length is equal to its outside diameter, it has been observed that the cylinders do not tend to align or group according to weight differences set up by thickness or density, as observed in conventional pellet configuration.

Therefore, cylindrical geometry of the bound oxidizing agent assists in preventing the aggregation phenomenon. However, the bound oxidizing agent may be formed into any of a number of appropriate geometries and configurations, as will be appreciated by those skilled in the art, which can provide the desired control of the duration and intensity of the chemical reaction and heat output along with reducing the fusion and aggregation phenomenon.

For example, the cylindrical bound oxidizing agent depicted in FIG. 1 is preferably produced by combining finely ground potassium permanganate crystals with suitably diluted sodium silicate solution in a uniform mixture, placing the pliable result into a mold, and then solidifying the casting by evaporating the water in a dry, slightly warmed air stream. Most preferably, the sodium silicate solution comprises at least about 10% diluent water. It has been found that sodium silicate solutions with less than 10% diluent water do not easily flow into and wet the potassium permanganate in a reliable fashion.

An important factor in choosing an appropriate binding agent is its ability to be diluted such that it can solubilize at any of a variety of chosen rates. For instance, when water is added to sodium silicate prior to forming the composition into the desired shape, a weaker and more porous bond between the sodium silicate molecules is formed. This weaker bond between molecules allows the binding agent to be solubilized relatively more quickly when exposed to the appropriate solvent as compared to a dilute sodium silicate composition formed with less water. When the rate of solubilization of the binding agent is increased, the bound oxidizing agent is exposed to the fuel at a greater rate, thus accelerating the rate of reaction and providing increased evolution of heat. Conversely, when the rate of solubilization of the binding agent is decreased, the bound oxidizing agent is exposed to the fuel at a relatively reduced rate, decreasing the rate of reaction and increasing the heat evolution. However, it is contemplated that any compatible oxidizing agents and/or binding agents known in the art may be used in conjunction with the present invention to provide the desired selected solubility.

Figure 2:
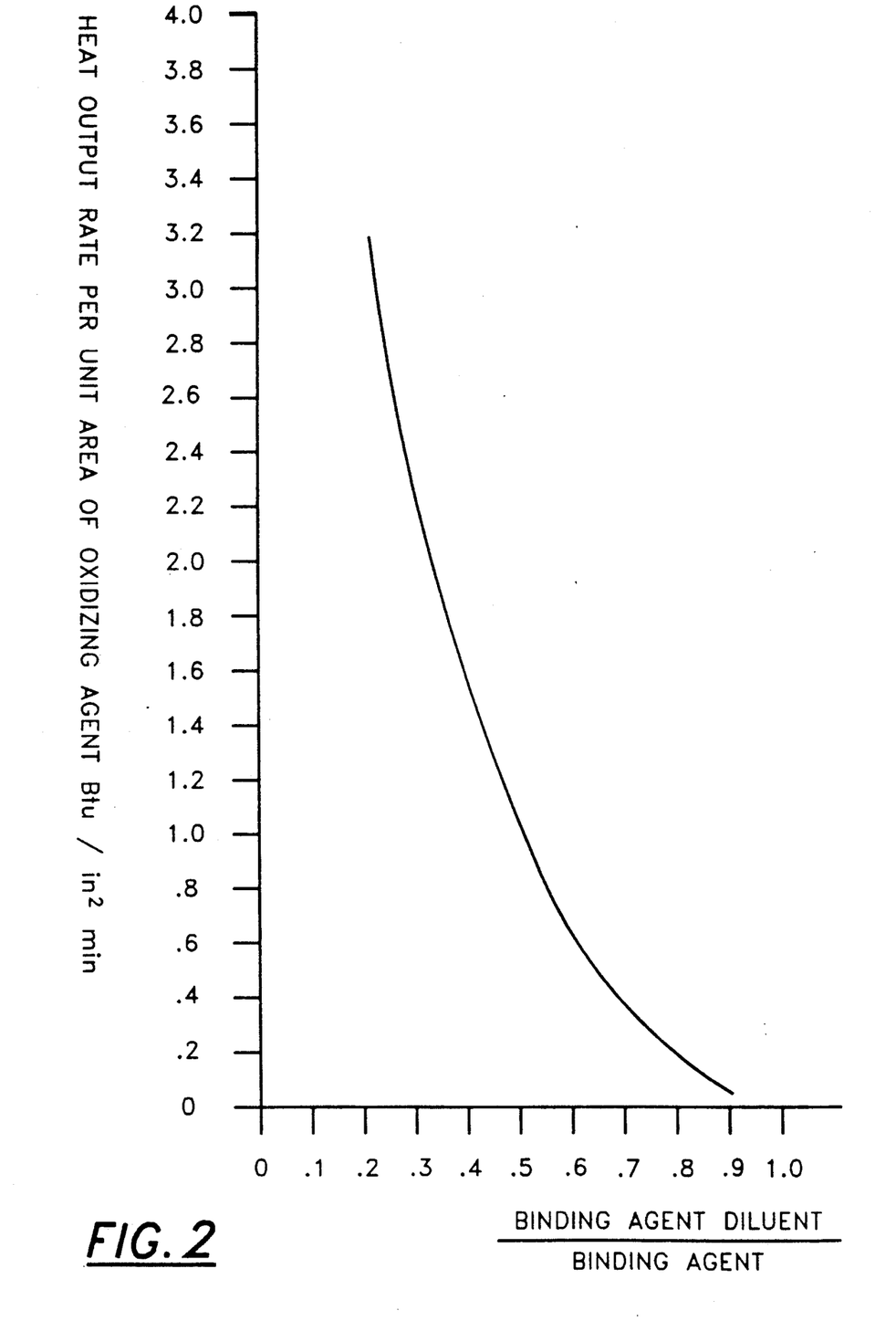
FIG. 2 is a graphic representation of the relationship between heat output rate per unit area of bound oxidizing agent versus ratio of binding agent diluent to binding agent.

FIG. 2 shows the relationship between heat output per unit area of bound potassium permanganate bound in sodium silicate in $BTU/m^2 min$ and the ratio of binding agent diluent (water) to binding agent (sodium silicate). FIG. 2 shows that the reaction rate between the oxidizing agent and the fuel, based on the nominal surface area of the oxidizing agent component of the reaction, can be varied by nearly two orders of magnitude by selectively diluting the sodium silicate binder with water. Thus, the bond strength of the sodium silicate binding agent is directly proportional to the ratio of the binder to the dilution water, as indicated in Table I below.

The surface recession values and the heat output rates in Table I are for potassium permanganate bound in sodium silicate. The bound oxidizing agent used in providing the data of Table I has a planar configuration with a length of 1.75 in., width of 1.0 in., and height of 0.041 in., with the oxidizing agent in contact with excess ethylene glycol fuel on only one exposed longitudinal planar surface.

TABLE I

| Bond Strength (Ratio of Binder to Dilution Water) | Surface Recession (inches/min) | Heat Output Rate ($Btu/in^2$ min) |
| --- | --- | --- |
| 75% | 0.004 | 0.25 |
| 62% | 0.0073 | 0.48 |
| 50% | 0.014 | 0.93 |

Therefore, by knowing the heat output rate of a particular oxidizing agent binder composition having a particular bond strength, and thus a particular rate of surface recession, the bound oxidizing agent of the present invention can provide a heat output appropriate for the particular oxidizing agent, fuel and application desired.

Figure 3:
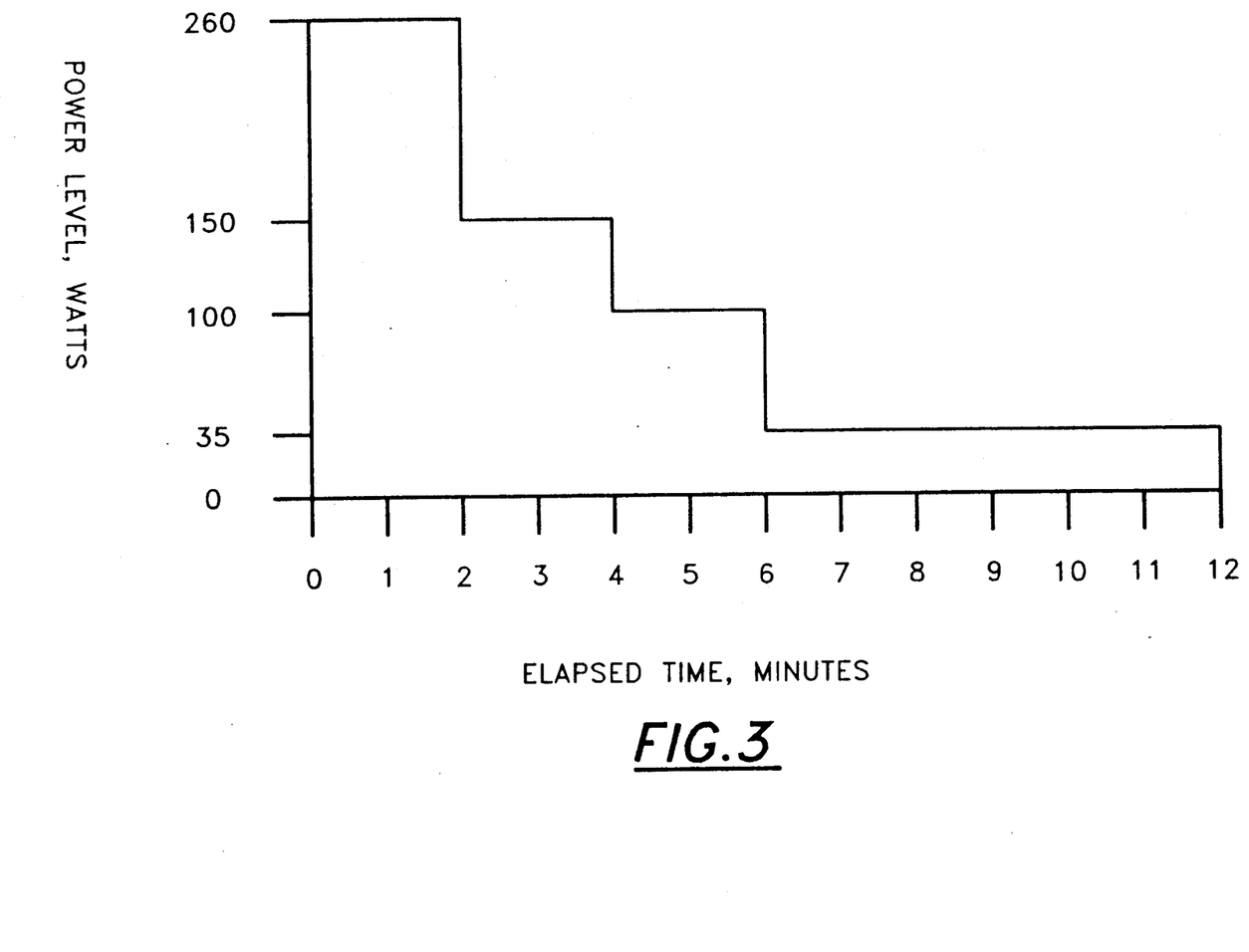
FIG. 3 is a graphic representation of one particular heat output profile produced by the present invention.
Figure 4:
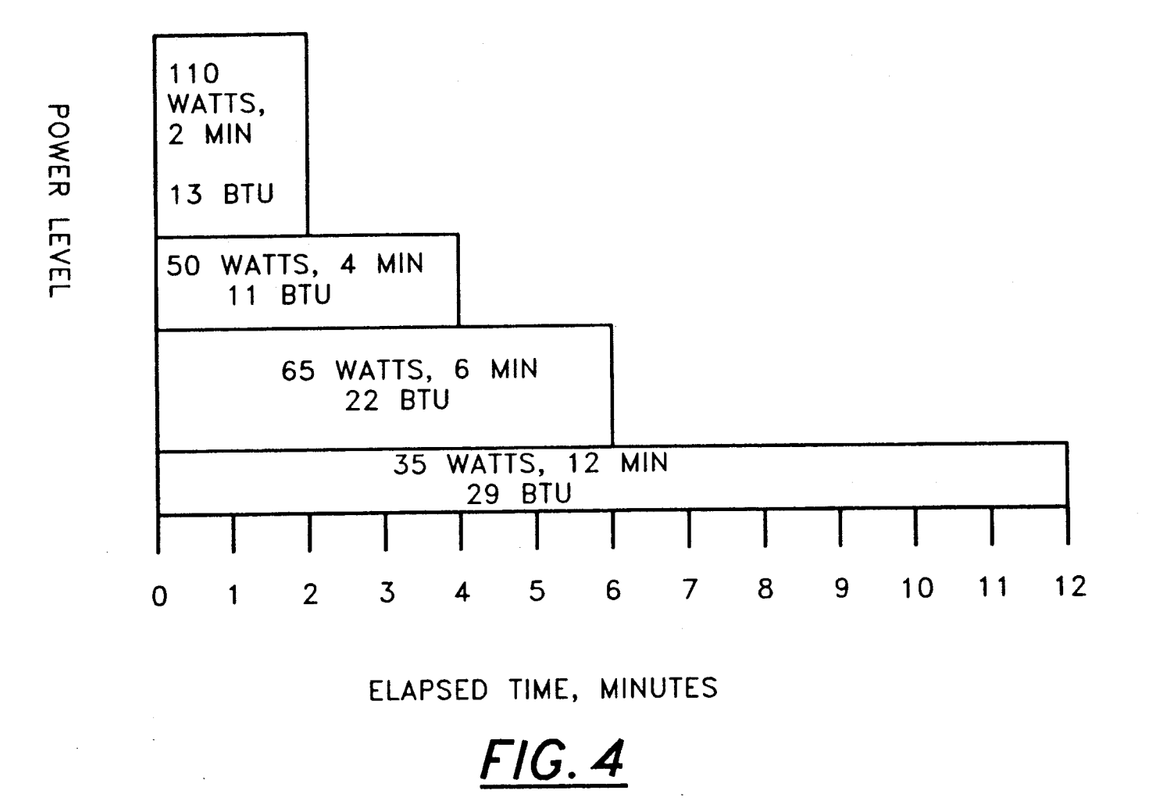
FIG. 4 depicts the power levels over time required of the present invention to provide the heat output profile of FIG. 3.

FIG. 3 provides an example of a heat output profile which may be used in conjunction with the bound oxidizing agent of the present invention. The profile has a duration of 12 minutes, with the total power level of heat desired to be produced ranging from a total of 260 watts for the first 2 minutes, reduced to 150 watts for minutes 2-4, further reduced to 100 watts for minutes 4-6 and finally reduced to 35 watts for the remainder of the duration of heat output. FIG. 4 depicts the heat output profile of FIG. 3, with the heat output provided in BTUs.

The four steps employing the three different bound oxidizing agent compositions to provide the particular heat output profile depicted in FIGS. 3 and 4 are shown in Table II. In Table II, four different bound oxidizing agent compositions are shown which have different surface areas, bond strengths and resultant penetration depths. The bond strengths correspond to the extent of solubilization of the binding agent during the reaction, the oxidizing agent comprising potassium permanganate and the fuel comprising ethylene glycol diluted 1:1 with water. The first composition provides a 110 watt heat output corresponding to 13 BTU from minutes 0-2, the second composition provides a 50 watt heat output corresponding to 11 BTU from minutes 0-4, the third composition provides a 65 watt heat output corresponding to 22 BTU from minutes 0-6 and the fourth composition provides a 35 watt heat output corresponding to 24 BTU from minutes 0-12.

TABLE II

| Time from Initiation (Minutes) | Bond Strength (Percent) | Penetration Depth (inches) | Surface Area (in.$^2$) |
|---|---|---|---|
| 0-2 | 50 | 0.028 | 6.7 |
| 0-4 | 62 | 0.029 | 6 |
| 0-6 | 75 | 0.024 | 14.8 |
| 0-12 | 75 | 0.048 | 8 |

For example, if the bound oxidizing agent comprises a cylindrical geometry of equal length and outside diameter, four groups of oxidizer pellets which provide the heat output profile of FIGS. 3 and 4, using the data from Table II can be made as shown in Table III.

TABLE III

| Bound Oxidizing Agent Configuration ⅛ inch OD × ⅛ inch Long Cylinders | | | | |
|---|---|---|---|---|
| Group | Active Time (Minutes) | Wall Thickness (inches) | Piece Ct. | Bond Strength (percent) |
| 1 | 0-2 | 0.056 | 21 | 50 |
| 2 | 0-4 | 0.058 | 19 | 62 |
| 3 | 0-6 | 0.048 | 47 | 75 |
| 4 | 0-12 | 0.096 | 25 | 75 |
| Approximate Volumes and Weights: | | | | |
| Bound Oxidizing Agent Cylinder Volume | | | 40 cc | |
| Oxidizing Agent Weight | | | 28 gm | |
| Binding Agent Weight | | | 3 gm | |
| Bound Oxidizing Agent Density | | | 1.91 gm/cc | |
| Oxidizing Agent Volume | | | 16 cc | |

Approximately 3.5 cc of ethylene glycol is required to consume 1 gram of potassium permanganate. Therefore, a minimum of 98 cc is required to expend all of the ethylene glycol and all of the potassium permanganate for the heater profile described in Table III. However, as the present invention is designed to provide controlled release and duration of the oxidization reaction, an excess of ethylene glycol is preferably provided in the reaction zone to assure continuous heat production to exhaustion of the potassium permanganate. Additionally, a certain volume of appropriate diluent is required to reliably dissolve the sodium silicate binder to expose the bound oxidizing agent to the fuel. For example, if 98 cc of ethylene glycol is required to consume the entirety of potassium permanganate, a 1:1 ratio of ethylene glycol to diluent (water) has been shown in the present system to reliably dissolve the binding agent such that the desired binding agent solubility and resultant heat output is achieved. Thus, a total of 196 cc of liquid solution, 98 cc comprising ethylene glycol and 98 cc comprising water, provides the requisite amount of fuel and binding agent diluent.

However, the proportion of diluent to fuel may vary dramatically, depending upon the desired application, along with other determinants such as capacity of the heater, binding agent strength and fuel dilution. The oxidizer castings employed in the preceeding tests comprise a minimum amount of diluted binder which will uniformly wet the potassium permanganate crystals. A ratio of about one gram of binder (wet) to about three grams of ground crystals was preferred in producing the oxidizer castings of the preceeding tests, as this ratio provided a uniform mixture with neither pools of excess binder nor crystals incompletely surrounded by liquid. However, it will be apparent to one skilled in the art that any appropriate ratio of binder to oxidizing agent is contemplated for use in the present invention.

A particular advantage of the present invention is the ability of the bound oxidizing agent to comprise a plurality of discrete layers. Commercially available sodium silicate air dries into a glassy material and has a composition which is suitable for repeated coatings so that one discreet unit may comprise a plurality of layers of bound oxidizing agent. The composition of these layers may comprise (1) binding agent having the same bond strength in each layer, with the oxidizing agent within each layer varying in concentration; (2) binding agent having different bond strengths in each layer, with the oxidizing agent within each layer having the same concentration; and (3) a combination of the two may be possible, namely a plurality of layers having different binding agent bond strengths in each layer and the oxidizing agent also having different concentrations in each layer. Additionally, any of a combination of the above-mentioned layer compositions may be used in conjunction with the present invention. By providing a plurality of binder layers, each having a different bond strength, a number of heat generation rate steps may be employed to approximate an exponential decrease in heat input required for a particular use. Therefore, any number of heat generation steps may be produced by one or a plurality of discreet bound oxidizing agent units to equal any desired predetermined intensity duration of heat input.

A bound oxidizing agent comprising a plurality of different layer compositions can provide the user of the present invention with precise control of the duration and rate of the exothermic oxidation reaction. For instance, the present invention allows the oxidizing agent to be selectively exposed to the fuel such that a known amount of unreacted oxidizing agent is exposed to a known amount of fuel, thereby producing a known, predeterminable heat output of any preselected duration at any preselected intensity. The present invention thus allows a user to vary this known, predetermined heat output between binding agent layers to construct virtually any desired heat output profile in one or more discreet bound oxidizing agent units.

Certain applications of the present invention may require a rapid heat-up process. Rapid pre-heating is preferably accomplished by adding unbound oxidizing agent crystals or oxidizing agent crystals bound with a dilute binder solution to the reaction milieu in an amount appropriate to raise the temperature of the contents of the heating system to the desired pre-heat temperature when initially contacted with the fuel. A rapid pre-heating process is particularily desirable when the present invention is used in conjunction with food heating devices where it is desirable to maintain the heat of the device at a constant level, yet have the device reach that level as quickly as possible.

Figure 5:
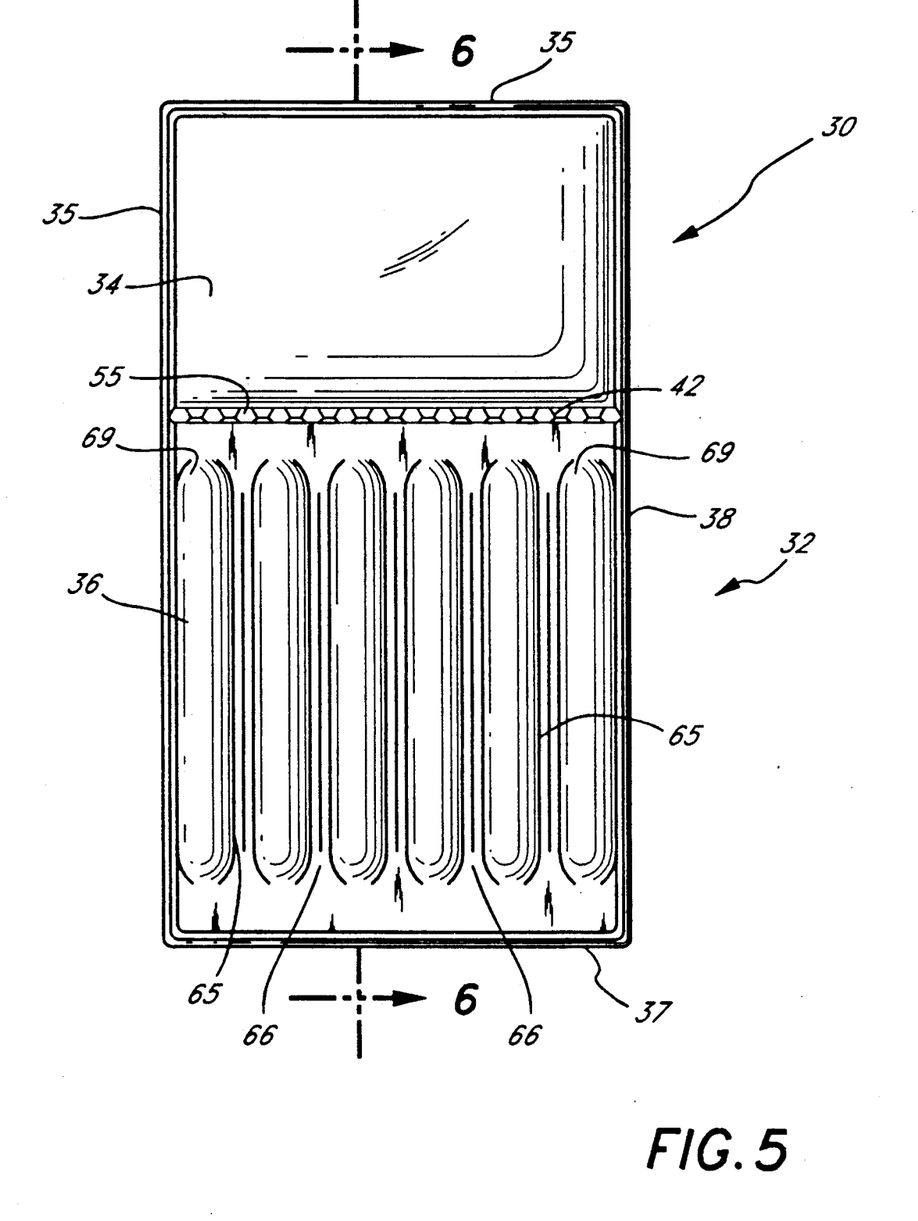
FIG. 5 is a plan view of a preferred embodiment of the apparatus of the present invention.
Figure 6:
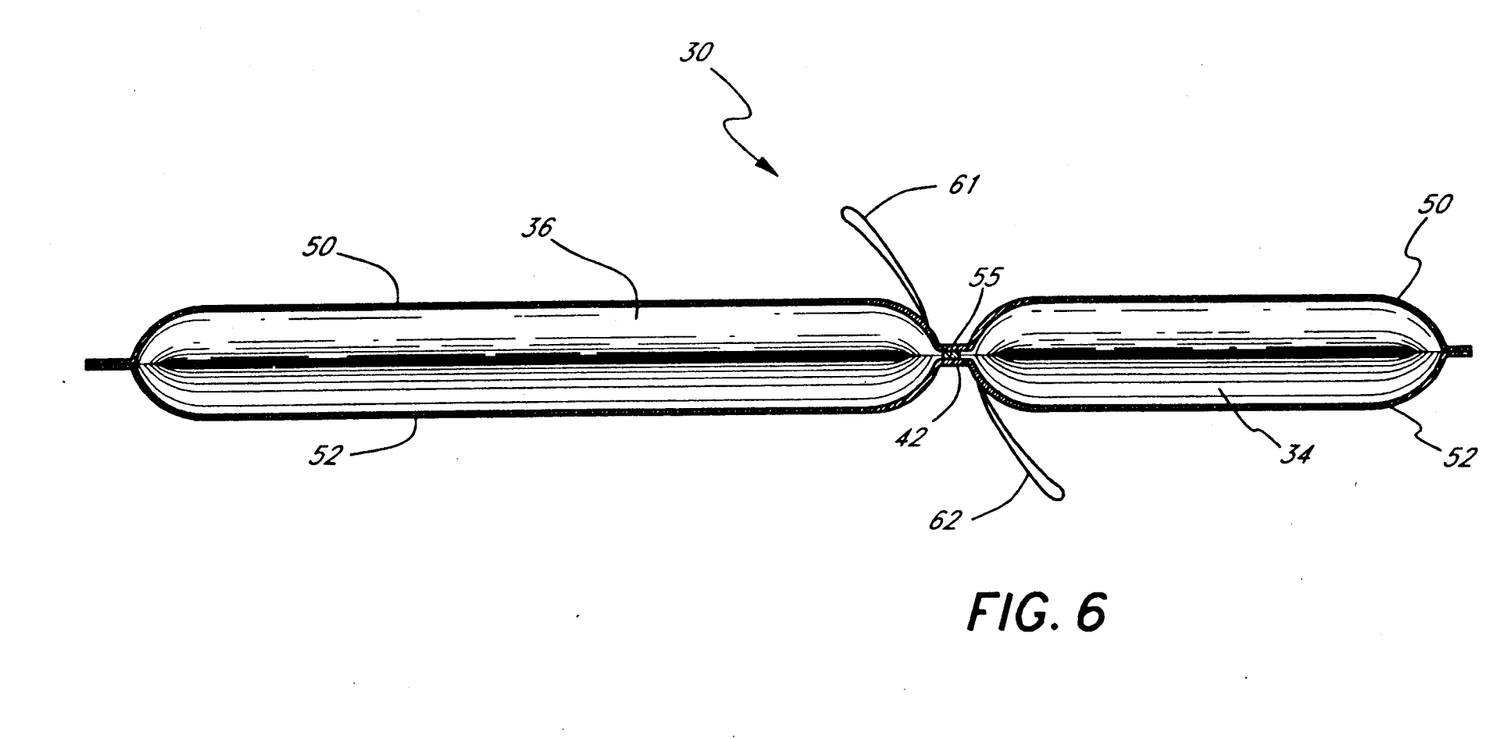
FIG. 6 is a sectional view of a preferred embodiment of the apparatus of the present invention taken along line 6—6 of FIG. 5.
Figure 7:
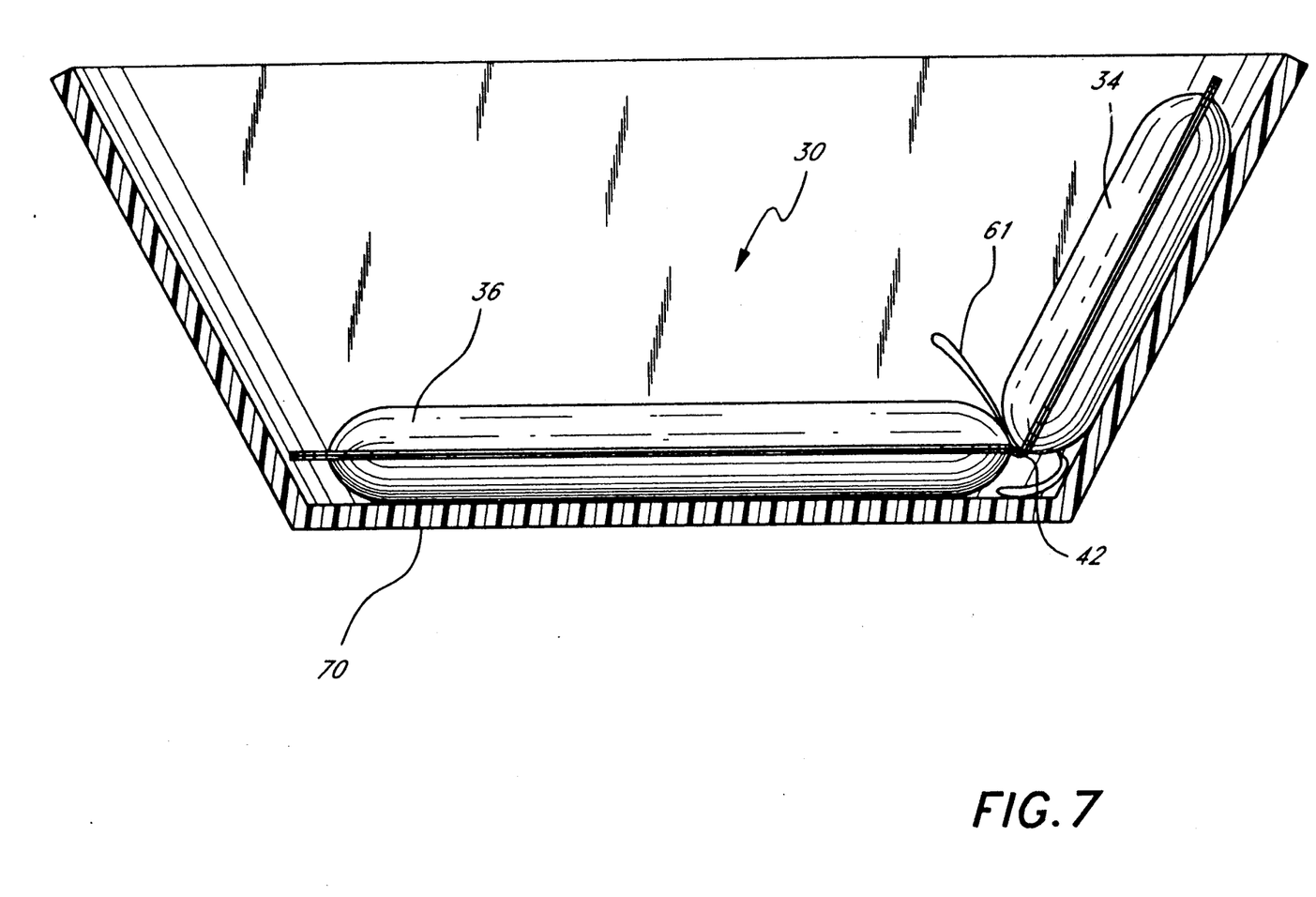
FIG. 7 is a sectional view of a preferred embodiment of the present invention placed inside a conventional foam food package.

As mentioned previously, the present invention has particular utility when used in conjunction with heating apparatus, particularly heating apparatus used to heat foods, and most particularly, heating apparatus which heats the foods using heat transferred by conduction. FIGS. 5-7 depict a preferred embodiment of a conduction food heating device of the present invention.

Referring to FIG. 5, a food heater 30 comprises a flexible container 32, the container 32 comprising a fuel zone 34 and an oxidizer zone 36. The zones 34, 36 contain the fuel and oxidizing agent, respectively. A separator 42 separates the fuel zone 34 from the oxidizer zone 36. The container 32 preferably comprises a flexible material which is not affected by either the oxidizer or the fuel and which is sufficiently heat-resistant. Such materials include polyethylene, polypropylene, mylar, aluminum, aluminized polymer film, and other conventional plastic or other packaging materials suitable for containing a liquid such as rubber, vinyl, vinyl-coated fabric and polyethylene. A thickness of about 0.02 mm to about 0.1 mm has been found to be satisfactory using clear vinyl.

Referring to FIG. 6, the container 32 may advantageously be constructed of thin, flexible, thermally conductive material comprising an upper layer 50 and lower layer 52 which are bonded together at the edges to form a hermetically sealed substantially planar envelope. In a preferred embodiment, the thermally conductive material is a metal foil, such as one composed substantially of aluminum or copper, or a metallized plastic film, such as aluminized mylar. The edges of the material may be bonded together by any suitable means, including soldering, heat sealing, ultrasonic welding, solvent welding, fold sealing, and the use of adhesives.

During fabrication of the heater 30, the container 32 preferably comprises an open end or side 35, 37 at each of the zones 34, 36 for introduction of the fuel and oxidizing agent, respectively. The other sides or edges 38 of the container 32 may be heat sealed. After addition of the fuel and oxidizing agent to the container, the open sides 35, 37 are sealed to make the container 32 fluid- and air-tight. The size and shape of the container 32 will vary according to its use. After assembly and prior to its use, the heater 30 is in a static condition, with the heater 30 preferably disposable after a single use. In an alternative embodiment of the present invention, a plurality of oxidizer zones and/or fuel zones are contemplated for use in the heater 30 of the present invention.

To initiate the exothermic oxidation reaction, the fuel must come into contact with the oxidizing agent. This is preferably accomplished in the present invention by selectively perforating or rupturing the separator 42 between the oxidizer 36 and fuel 34 zones so that the fuel is exposed to the oxidizer. In a preferred embodiment, the fuel flows into the oxidizer zone so as to come in contact with the bound oxidizing agent. However, it is also contemplated that the bound oxidizing agent may be releasable into the fuel zone 34. It is contemplated that the separator 42 will comprise a material which will allow its rupture or perforate when either zone 34, 36 is deformed.

Pressure against or along the separator 42 selectively ruptures or perforates the separator, yet leaves the outer surfaces of the container 32 and the surfaces surrounding the container 32 and oxidizer 36 and fuel 34 zones intact. The separator 42 may be comprised of any of a number of functional configurations. In a preferred embodiment, the separator 34 comprises a weakened wall 55 extending between the fuel zone 14 and the oxidizer zone 16, which is separable by separating the separator 22. The separator 42 may preferably be separated by use of pull tabs 61, 62. When pulled, the pull tabs 61, 62 separate the separator 42 and provide fluid communication between the fuel zone 34 and the oxidizer zone 36. However, the separator 42 may also comprise a hole with a stopper, the stopper displaced and thereby opening the hole into which it is placed when pressure is placed against it. Alternatively, the separator 42 may comprise a wall having weakened or thin areas which rupture when pressure is applied against it. In another embodiment, the separator may comprise a wall having a plurality of perforations which will, when pressure is placed against them, rupture and expose the fuel to the oxidizer. The separator 42 may likewise consist of a moveable disk or cap, pierced or otherwise, or a valve, such as a frangible valve.

Alternatively, the separator 42 may be configured to form one or preferably a plurality of fissures or slits when the separator is subjected to external pressure. The fissures may extend inwardly from the edges or perimeter of the separator, or they may be located intermediate the edges or perimeter of the separator 42. However, any adequate means for separating the separator 42 known in the art are contemplated for use in the present invention.

The container 42 may preferably be provided with suitable means for heat transfer. Suitable means may include an internal structural lattice, mesh or other space-filling inserts 65 for separating the bound oxidizing agent units so that uniform heat distribution throughout the oxidizer zone 36 is achieved. For example, the units may be separated into alternating narrow columns 66, thus providing an even distribution of heat output during the reaction. In addition, communicating channels 69 may be provided within the oxidizer zone 36 of the container 32 through which the fuel may flow into the oxidizer zone 36. Preferably, the channels 69 are oriented so that all channels 69 are interconnected into a single cavity.

The fueL and oxidizing agent of the present invention must be complementary. Suitable choices for these components may be any combination able to provide the desired characteristics of the present invention as outlined above, meet government standards for safety and be compact. Moreover, for some applications, the oxidizing agent and fuel should conform to applicable government standards in case any discharge into the surroundings, accidental or otherwise, occurs. However, in the preferred embodiment, the oxidizing agent comprises potassium permanganate and the fuel ethylene glycol, propylene glycol or glycerine.

As shown in FIG. 7, the heater 30 of the present invention may be advantageously adapted to be placed into a food container for hot food, for instance, sandwiches. These containers may comprise foam, paper, cardboard or plastic, but are preferably made of a biodegradable substance having insulative qualities. The container should be lightweight, inexpensive, non-bulky, and disposable. Preferably, the container includes a top (not shown) for preventing heat transfer from the hot food portion.

Referring to FIG. 7, the heater 30 of the present invention may be used in conjunction with a conventional molded foam container 70 used for retaining the heat of sandwiches placed therein. These foam containers typically require about 10 watts of heat input in order to maintain the interior temperature of the food at approximately 130° F., a temperature which allows heated food to remain palatable. Using this temperature figure, if it is required that the interior temperature be maintained for ½ hour, it has been calculated that 5 watt hours, or 17 BTU, of heat input must be provided to the food contained within the container to keep the food at the ingested palatable temperature of 130° F. To provide 5 watt hours, or 17 BTU, approximately 7 grams of potassium permanganate and 25 ml of ethylene glycol are required to provide 17 BTUs of heat output.

Thus, the total system volume after the reactants are mixed together is about 60 ml, assuming a 1:1 dilution of the ethylene glycol fuel. In this embodiment, the bound oxidizing agent comprises a substantially planar geometry, with the bound oxidizing agent only in contact with the fuel/water mix on one planar surface, the active area is about 20 in$^2$. An active area of this size is required to produce 0.028 BTU/in$^2$/min. Thus, a heater useful for this service can be used having a bound oxidizing agent having a concentration of binder of about 85% v/v. However, it will be apparent to those skilled in the art that any of a variety of bound oxidizing agent compositions may provide the requisite heat output of the present example.

A configuration of the bound oxidizing agent would thus require an adjustment of the area and thickness to exactly match the desired production to provide the aforementioned heat output figures. Thus, by providing the container 12 of the present invention to fit in the bottom of the foam container, a pad of approximately 3.25 in$^2$ would be required, with the bound oxidizing agent having a planar geometry and thickness of approximately less than 1 cm.

While particular embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A heater, comprising:
   a disposable container divided into a first zone and a second zone;
   a substantially solid oxidizing agent sealed within the first zone, wherein particles of said oxidizing agent are embedded in solid pieces of a dissolvable binder and are dispersed throughout said binder;
   a substantially liquid fuel sealed within the second zone of said container; and
   a separator disposed between said first zone and said second zone, said separator being operable to provide fluid communication between said first zone and said second zone, said fluid communication initiating a controlled exothermic chemical reaction within said container.

2. The heater of claim 1, wherein said exothermic reaction occurs in an aqueous environment.

3. The heater of claim 1, wherein said container comprises material resistant to said exothermic chemical reaction.

4. The heater of claim 1, wherein said oxidizing agent comprises potassium permanganate.

5. The heater of claim 1, wherein said fuel comprises a polyhydroxy compound.

6. The heater of claim 5, wherein said fuel comprises ethylene glycol.

7. The heater of claim 3, wherein said container comprises a polymer material.

8. The heater of claim 1, wherein said container comprises a thin-walled envelope that conforms to the shape of its surroundings.

9. The heater of claim 1, further comprising means for providing propagation of said reaction at a controlled rate.

10. The heater of claim 9, wherein said means for providing propagation comprises a selectively dissolvable binding agent into which said oxidizing agent is bound.

11. The heater of claim 9, wherein said selectively dissolvable binding agent comprises sodium silicate.

12. The heater of claim 11, wherein said sodium silicate is diluted with water.

13. The heater of claim 12, wherein said sodium silicate is dissolvable in said fuel.

14. The heater of claim 6, wherein said ethylene glycol is mixed with an inorganic solvent.

15. The heater of claim !, wherein said fuel comprises a mixture of ethylene glycol and water.

16. The heater of claim 10, wherein said binding agent is soluble in water.

17. The heater of claim 10, wherein said binding agent dissolves during said exothermic reaction to controllably expose said oxidizing agent to said fuel at a predetermined rate.

18. The heater of claim 10, wherein said binding agent is mixed with said oxidizing agent to provide a constant nominal surface area of said oxidizing agent as said binding agent is solubilized.

19. The heater of claim wherein said separator comprises a single-use frangible membrane.

20. A method for heating food, comprising the steps of:
   a. providing a heating apparatus, comprising:
      (1) a container having a separate first and second zone;
      (2) particles of an oxidizing agent embedded in solid pieces of a dissolvable binder and dispersed throughout said binder;
      (3) a fuel within said second zone susceptible to spontaneous oxidation by said oxidizing agent;
      (4) a separator disposed between said first zone and said second zone to separate said fuel from said oxidizing agent;
   b. Compromising said separator to permit contact between said oxidizing agent and said fuel, thereby initiating an exothermic chemical reaction;
   c. controlling said exothermic chemical reaction by gradually dissolving said binding agent to selectively expose said oxidizing agent to said fuel;
   d. providing a food portion in association with said container; and
   e. heating said food portion by heat evolved from said exothermic chemical reaction.

21. The method of claim 20, wherein said fuel is a polyhydroxy compound.

22. The method of claim 20, wherein said oxidizing agent is potassium permanganate.

23. A method of providing a controlled exothermic chemical reaction, comprising the steps of:
   providing an oxidizing agent bound within a binding agent, so that particles of said oxidizing agent are embedded in solid pieces of said dissolvable binding agent and are dispersed throughout said binding agent;

providing a fuel which is capable of reacting with said oxidizing agent;

combining said bound oxidizing agent and said fuel to initiate an exothermic chemical reaction; and gradually dissolving said binding agent to controllably and continuously expose new particles of said oxidizing agent to said fuel.

24. The method of claim 23, wherein said oxidizing agent comprises potassium permanganate.

25. The method of claim 23, wherein said binding agent comprises sodium silicate.

26. The method of claim 23, wherein said fuel comprises a polyhydroxy compound.

27. The method of claim 26, wherein said polyhydroxy compound comprises ethylene glycol.

* * * * *